(12) United States Patent
Sato

(10) Patent No.: US 7,523,354 B2
(45) Date of Patent: Apr. 21, 2009

(54) DISK CONTROLLER HAVING PATH OBSTRUCTION DETERMINATION FUNCTION

(75) Inventor: Hiroaki Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 508 days.

(21) Appl. No.: 11/441,131

(22) Filed: May 26, 2006

(65) Prior Publication Data

US 2007/0180045 A1    Aug. 2, 2007

(30) Foreign Application Priority Data

Jan. 30, 2006    (JP)    ............................. 2006-020090

(51) Int. Cl.
*G06F 11/00* (2006.01)

(52) U.S. Cl. ............................. 714/43; 714/6

(58) Field of Classification Search ................ 714/43
See application file for complete search history.

(56) References Cited

U.S. PATENT DOCUMENTS

| | | | |
|---|---|---|---|
| 7,152,183 B2 * | 12/2006 | Fujibayashi | .................... 714/6 |
| 7,188,273 B2 * | 3/2007 | Allen et al. | ..................... 714/6 |
| 7,194,662 B2 * | 3/2007 | Do et al. | ........................ 714/43 |
| 7,228,458 B1 * | 6/2007 | Kesavan | ....................... 714/41 |
| 7,346,800 B2 * | 3/2008 | Hatasaki et al. | ................ 714/3 |
| 2002/0023151 A1 * | 2/2002 | Iwatani | ....................... 709/223 |
| 2004/0153691 A1 * | 8/2004 | Fujimoto et al. | ............... 714/3 |
| 2004/0236983 A1 * | 11/2004 | Burton et al. | .................. 714/6 |
| 2004/0255186 A1 * | 12/2004 | Lau | ................................. 714/6 |
| 2006/0117211 A1 * | 6/2006 | Matsunami et al. | ............ 714/4 |

FOREIGN PATENT DOCUMENTS

JP    2001-027972    1/2001

* cited by examiner

*Primary Examiner*—Scott T Baderman
*Assistant Examiner*—Paul F. Contino
(74) *Attorney, Agent, or Firm*—Staas & Halsey LLP

(57) ABSTRACT

In a disk controller having a plurality of controller modules (CMs), the CM includes a path obstruction determination unit for obstructing a part in which an anomaly occurs when the anomaly occurs on a communication path for communications between CMs, and, when the plurality of CMs cannot communicate between them due to the obstruction of the part, for determining an object to be separated in a way that prioritizes a CM which retains data that has not been duplicated over a CM which retains data that has been duplicated among the CMs which cannot communicate; and a separation control unit for disabling a CM that is determined to be an object to be separated by the path obstruction determination unit.

5 Claims, 20 Drawing Sheets

| MODULE ID | ROLE | DIRTY FLAG | DI PORT STATUS | ETC. |
|---|---|---|---|---|
| ⋮ | ⋮ | ⋮ | ⋮ | ⋮ |

FIG.18A

| MODULE ID OF MASTER CPU | PATH STATUS | TRANSFER CIRCUIT NP STATUS | TRANSFER CIRCUIT SP STATUS | ETC. |
|---|---|---|---|---|
| ⋮ | ⋮ | ⋮ | ⋮ | ⋮ |

FIG.18B

| STATUS | ETC. |
|---|---|
| ⋮ | ⋮ |

FIG.18C

| STATUS | ETC. |
|---|---|
| ⋮ | ⋮ |

FIG.18D

- Prior Art -

DISK CONTROLLER HAVING PATH OBSTRUCTION DETERMINATION FUNCTION

CROSS-REFERENCE TO RELATED APPLICATIONS

This application claims priority from Japanese patent application Ser. No. 2006-020090 filed Jan. 30, 2006, the contents of which are incorporated by reference herein.

BACKGROUND OF THE INVENTION

1. Field of the Invention

The present invention relates to disk controllers and particularly to a disk controller having a path obstruction determination function for determining controller modules (herein after called "CM") to be obstructed and obstructing them in a way that minimizes effects on a system when an anomaly occurs in a data transfer path between a plurality of controller modules in a disk controller.

2. Description of the Related Art

FIG. 19 shows an example of a conventional disk controller. In FIG. 19, reference numeral 200 denotes a disk controller; reference numeral 201 each denotes a controller module (CM) which is responsible for data transfer control and error handling between a host processor and a disk device; reference numeral 202 denotes a path setting device having a switching function; reference numeral 203 denotes a channel adapter (CA) having an interface with the host processor; and reference numeral 204 denotes a device adapter having an interface with the disk device. The path setting device 202 is also called a Front End Router (FRT).

An I/O request from the host processor (not shown) to the disk device (not shown) is sent from a channel adapter 203 via a path setting device 202 to one of the plurality of CM 201 and then sent from such a CM 201 via a path setting device 202 to a device adapter 204, and thereby performing I/O to the disk device In the conventional disk controller 200 as shown in FIG. 19, since channel adapters 203 and device adapters 204 are mounted on path setting devices 202 so that CMs 201, channel adapters 203, and device adapters 204 are each configured to be interconnected arbitrarily at any time, when a fault such as a failure occurs at any module, extent of impact of the fault can be localized in relatively easy way by obstructing and separating only a portion where the fault occurs.

In a disk controller described in Japanese Patent Laid-Open No. 2001-27972, each cluster which is composed of a plurality of channel adapter modules, a plurality of switch modules, and one cache module is supplied with power from different source, and each channel adapter or disk adapter module is able to set a plurality of path for transferring data from/to a particular cache module. The disk controller described in the above patent document also basically uses the same scheme as the disk controller illustrated in FIG. 19 with respect to obstructing and separating a module when a fault occurs.

FIG. 20 is a diagram for describing problems to be solved by the present invention. The inventor has been working on a development of new disk controller as shown in FIG. 20 that is different from the conventional disk controller. In FIG. 20, reference numerals 10, 11 each denotes a controller module (CM) which is responsible for data transfer control and error handling between a host processor and a disk device; reference numerals 70, 71 each denotes a path setting device having a switching function; reference numerals 40, 41 each denotes a channel adapter (CA) having an interface with the host processor; reference numerals 50, 51 each denotes a device interface (DI) having an interface with the disk device and corresponding to the device adapter shown in FIG. 19; and reference numerals 60, 61 each denotes a transfer circuit which is composed of a DMA chip and the like for transferring data.

The disk controller shown in FIG. 20 is greatly different from the conventional disk controller 200 as shown in FIG. 19 in that there are the channel adapters as host interfaces and the device interfaces as interfaces with the disk devices in the CMs 10, 11. This is intended to simplify a path for transferring data from the host processor to the disk device via the CM 10 or 11 as much as possible and thereby facilitating control, as well as to achieve cost reduction of the CM including channel adapters and device interfaces.

In addition, data transfer between the CM 10 and the CM 11 is performed via the transfer circuit 60, 61 and the path setting device 70 or 71 as required.

Thus, in the disk controller illustrated in FIG. 20, since the channel adapters and the device interfaces exist in the CM 10, 11, there is a problem that, when the CM 11 is obstructed for example, channel adapters 41 and device interfaces 51 of the CM 11 are also obstructed and therefore its effect on the system becomes increased. As used herein, obstruction means a state in which a particular part such as a device and a circuit is unavailable.

SUMMARY OF THE INVENTION

An object of the present invention is to solve the problem described above and allow the operation to continue as long as possible by partly obstructing an abnormal part in consideration of an effect of obstruction of a CM when the CM is abnormal so that an effect of obstruction of the part or the CM can be reduced.

The present invention provides a disk controller, including a plurality of controller modules (CM) for controlling data transfer between a host processor and a disk device, each controller module having one or more channel adapter having an interface with the host processor, one or more device interfaces having an interface with the disk device, and one or more transfer circuit for communication, wherein the plurality of CMs are primarily characterized in that a CM to be obstructed for continuing the operation is determined based on a state of the device such as a configuration of the device, an obstruction state of parts, and whether or not data is being retained, in a disk controller having a function to communicate to/from other disk controller via a communication path using the transfer circuit.

In other words, at least one of CM in the disk controller according to the present invention includes: a path obstruction determination unit for obstructing a part in which an anomaly occurs when the anomaly occurs on a communication path between CMs, and, when the plurality of CMs cannot communicate with each other due to the obstruction of the part, for determining an object to be separated among the CMs which cannot communicate, giving priority to a CM which retains data that has not been duplicated over a CM which retains data that has been duplicated; and a separation control unit for disabling the CM that is determined as an object to be separated by the path obstruction determination unit. This allows an availability of the CMs to be increased and thus the effect of fault on the system becomes reduced.

In addition, when the path obstruction determination unit cannot determine an objective CM to be separated based on whether retained data has been duplicated or not, the path obstruction determination unit may determine an objective CM to be separated based on the position and the number of the obstructed parts on the communication path. Therefore, a CM with small possibility to be able to be used can be separated preferentially.

Furthermore, when the path obstruction determination unit cannot determine an objective CM to be separated based on the position and the number of the obstructed part on the communication path, the path obstruction determination unit may determine an object to be separated giving priority to a CM other than one CM that is a predefined master. This allows a slave CM whose effect of separation is small relative to the master CM to be separated preferentially.

In addition, the path obstruction determination unit may check survival of other CM which is a candidate for an object to be separated, when its own CM is a candidate to be separated, by communication means which is different from communications using a communication path, and then, if the survival of the checked CM cannot be confirmed, the path obstruction determination unit may determine an object to be separated to be the CM whose survival cannot be confirmed. Therefore, a CM with small possibility to be able to be used can be separated preferentially.

In a disk controller which is composed of a transfer circuit in which communication paths between CMs are attached on each CM and a path setting device having a switching function which interconnects the transfer circuit, the path obstruction determination unit is configured to obstruct a part where an anomaly occurs, and, when a communication between the CMs is disabled, determine an object to be separated to be a CM whose part is obstructed and thereby obstructs all communication paths, and, if an object to be separated cannot be determined in this way, determine an object to be separated among the CMs which cannot communicate in a way that prioritizes a CM which retains data that has not been duplicated over a CM which retains data that has been duplicated. This allows a CM to be separated to be selected effectively particularly in a disk controller having three or more CMs.

According to the present invention, when an anomaly is detected in a CM, an abnormal part inside the CM is partly obstructed instead of obstructing the CM immediately, and the operation is continued without separating the CM as long as a communication path between CMs exists and a communication between the CMs is possible. When a communication path between the CM is lost and a communication between the CMs is impossible, a CM which retains data that has been duplicated and thereby prevents data loss is preferentially selected as an object to be separated, and then the operation is continued. Therefore, the effect of fault on the system can be reduced.

BRIEF DESCRIPTION OF THE DRAWINGS

FIGS. 18A, 18B, 18C, and 18D are examples of table structures used by a CM;

DETAILED DESCRIPTION OF THE PREFERRED EMBODIMENTS

Figure 1:
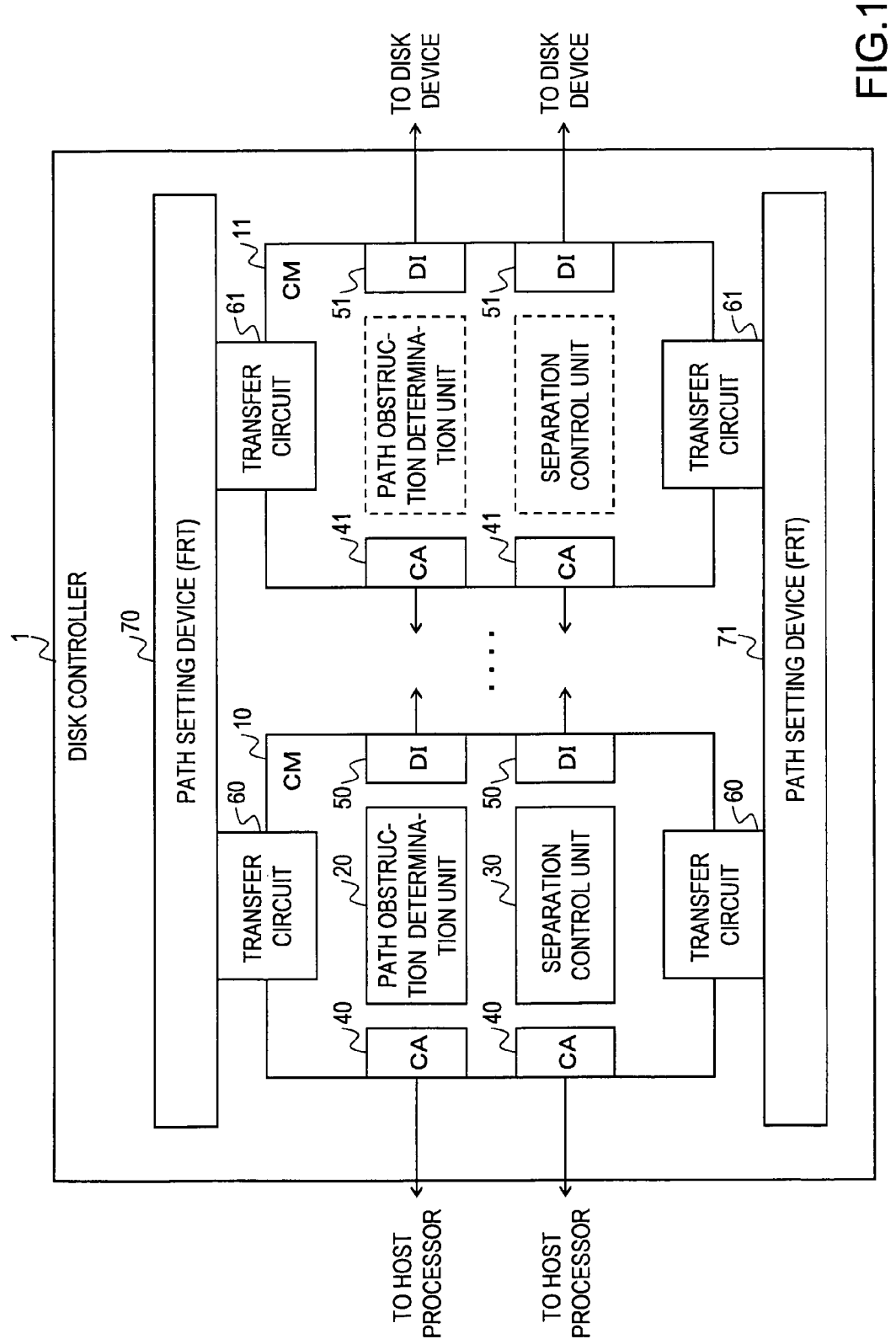
FIG. 1 is a configuration example of a disk controller according to an embodiment of the present invention.

FIG. 1 is a configuration example of a disk controller according to an embodiment of the present invention. A disk controller 1 shown in FIG. 1 includes a plurality of controller modules (CM) 10, 11, . . . , and path setting devices (FRTs) 70, 71 having a switching function for interconnecting each CM. CMs 10, 11 is responsible for data transfer control, error handling and so on between a host processor and a disk device, and includes channel adapters (CAs) 40, 41 each having an interface with the host processor, device interfaces (DIs) 50, 51 each having an interface with the disk processor, and transfer circuits 60, 61 which is composed of a DMA chip and the like for data transfer and message communication.

When the number of CM is two in the disk controller 1, that is, in a case of two CM configuration, instead of providing the path setting devices 70, 71, a transfer circuit 60 of one CM 10 and a transfer circuit 61 of the other CM 11 may be configured to be connected directly.

In the present embodiment, the CM 10 includes a CPU for performing data transfer control, error handling, and so on, and includes a path obstruction determination unit 20 and a separation control unit 30 which are realized by the CPU and programs. The CM 11 is similar to the CM 10.

A summary of processes performed by the path obstruction means 20 and separation control unit 30 will be described with references to FIGS. 2 to 4.

Figure 2:
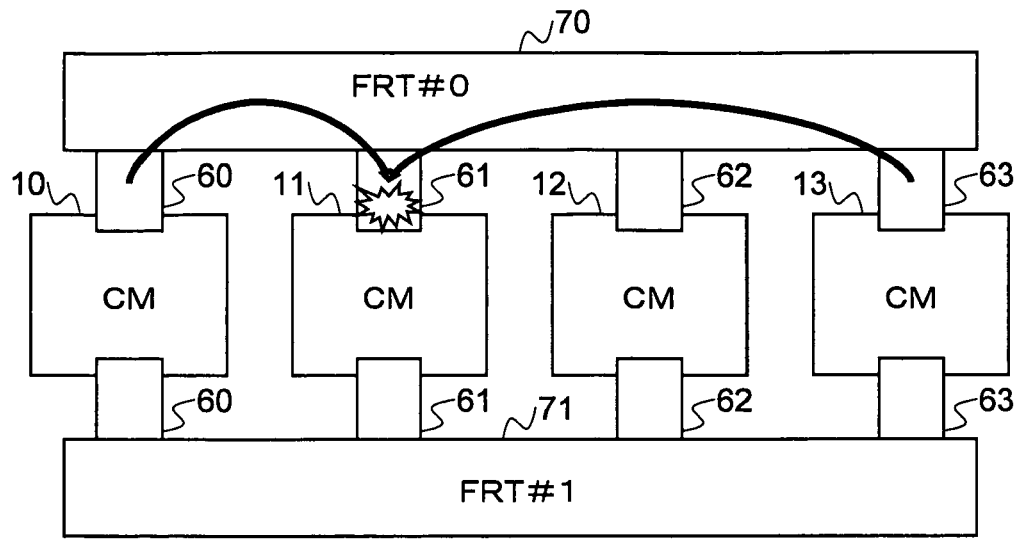
FIG. 2 is a diagram which illustrates a process of obstruction of a communication path.
Figure 2:
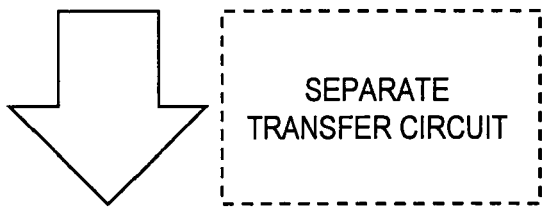
Figure 2:
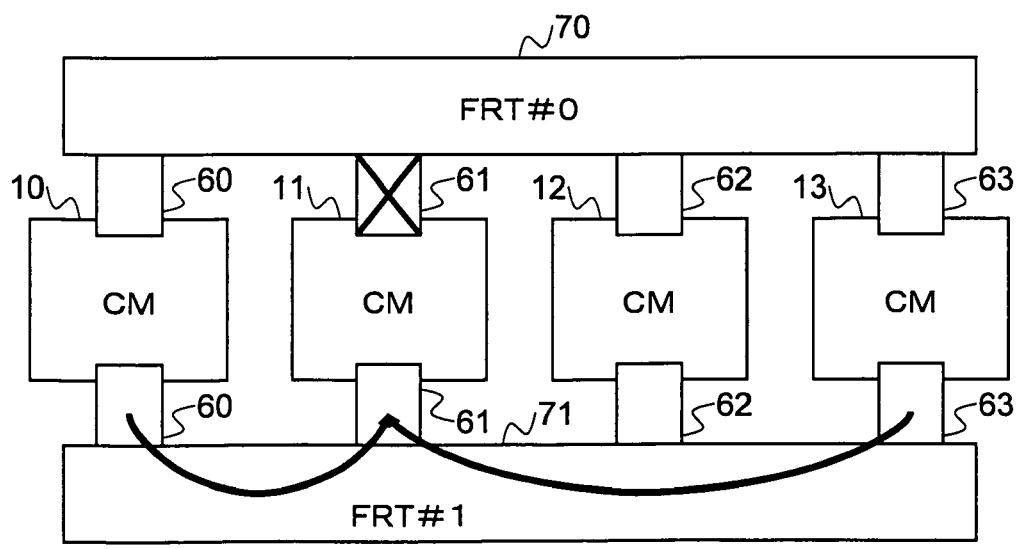
Figure 3:
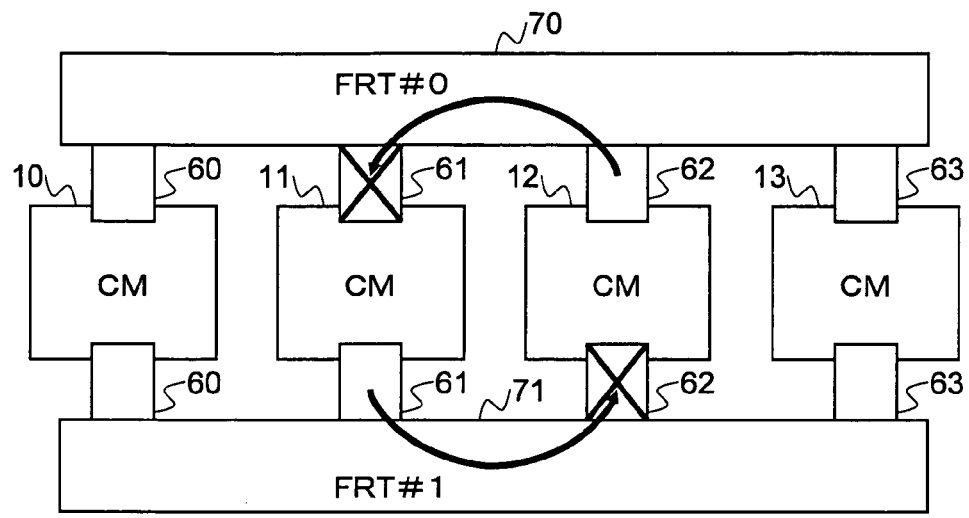
FIG. 3 is a diagram which illustrates a process of separation of a CM in a configuration having three or more CMs.
Figure 3:
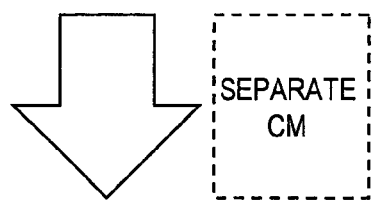
Figure 3:
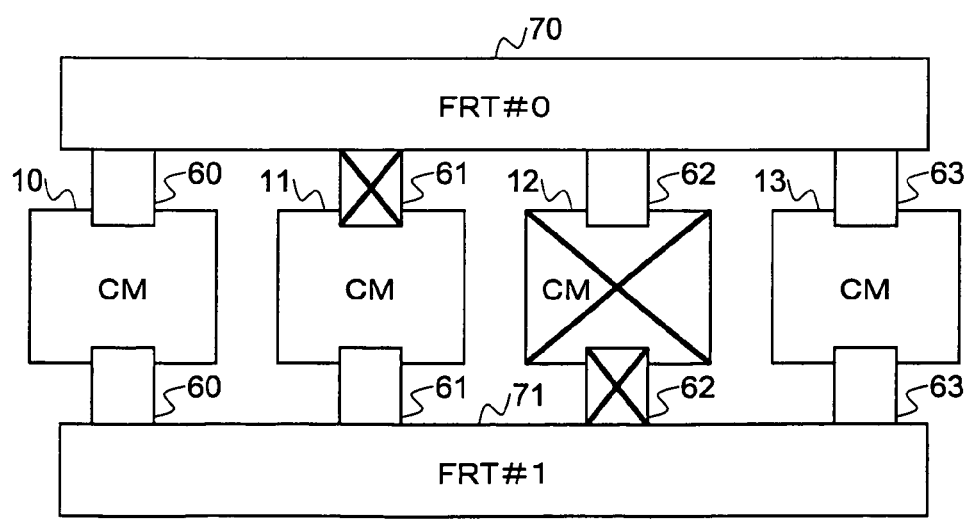

FIG. 2 is a diagram which illustrates a process of obstruction of a communication path. Note that each CM 10 to 13 includes two transfer circuits 60 to 63 respectively, and is adapted to be able to communicate between CMs through a communication path set by a path setting device 70 or 71. In the present embodiment, obstruction of a communication path is performed as described below.

When an anomaly is detected in a communication between CMs, communication between CMs is performed using a communication path on the opposite side instead of using a communication path in which the anomaly is detected by separating a transfer circuit composed of a DMA chip which performs data transfer between CMs, message communication, and so on so that the operation is continued without obstructing a CM. In other words, as illustrated in the upper part of FIG. 2A, when an anomaly is occurred in a transfer circuit 61 so that a communication from the CM 10 or the CM 13 to the CM 11 through the path setting device 70 cannot be performed, the transfer circuit 61 on the path setting device 70 side in the CM 11 is obstructed and separated instead of separating the CM 11. This allows the communication from the CM 10 or the CM 13 to the CM 11 to be performed through the other path setting device 71, as illustrated in the lower part of FIG. 2, so that the operation is continued.

However, as more transfer circuits are obstructed by separating them, some CMs may have no communication path and thus cannot communicate. To solve this problem, the operation is continued by separating a CM which cannot communicate. In the example of FIG. 3, a transfer circuit 61 on the path setting device 70 side in the CM 11 and a transfer circuit 62 on the path setting device 71 side in the CM 12 are obstructed. In this case, as illustrated in the upper part of FIG. 3, since there is not a communication path between the CM 11 and the CM 12, they cannot communicate with each other. Thus, a CM that is less important one between the CM 11 and the CM 12 (for example, the CM 12) is obstructed as illustrated in the lower part of FIG. 3. As a result of this, a CM to which the CM 11 cannot communicate does not exist and therefore the operation can be continued.

Figure 4:
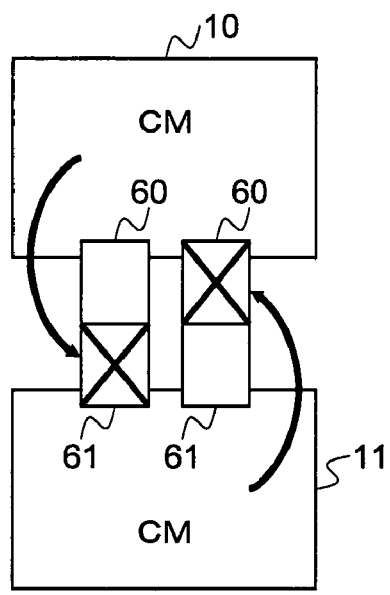
FIG. 4 is a diagram which illustrates a process of separation of a CM in a configuration having two CMs.
Figure 4:
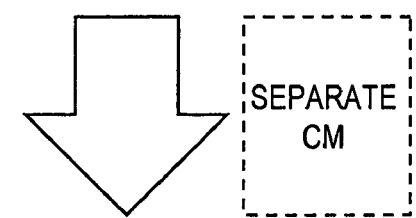
Figure 4:
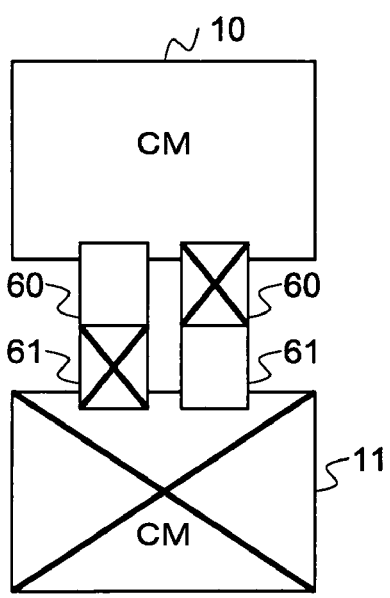

FIG. 4 shows an example of obstruction of a CM when the disk controller 1 is configured to have two CMs. In the configuration wherein the disk controller 1 does not have the path setting device 70, 71, and a transfer circuit 60 and a transfer circuit 61 is directly connected, as illustrated in the upper part of FIG. 4, if one side of transfer circuit 60, 61 are obstructed on the transfer circuits 10, 11 respectively, a communication path between the CM 10 and the CM 11 is lost. In this case, the CM 11 is separated as illustrated in the lower part of FIG. 4. This allows the disk controller 1 to continue operation using one CM 10.

Additionally, in this case, an effect on the system may be greatly different depending on whether the CM 10 or the CM 11 is separated. Therefore, in the present invention, a CM whose effect is small is preferentially selected as an object to be separated.

Figure 5:
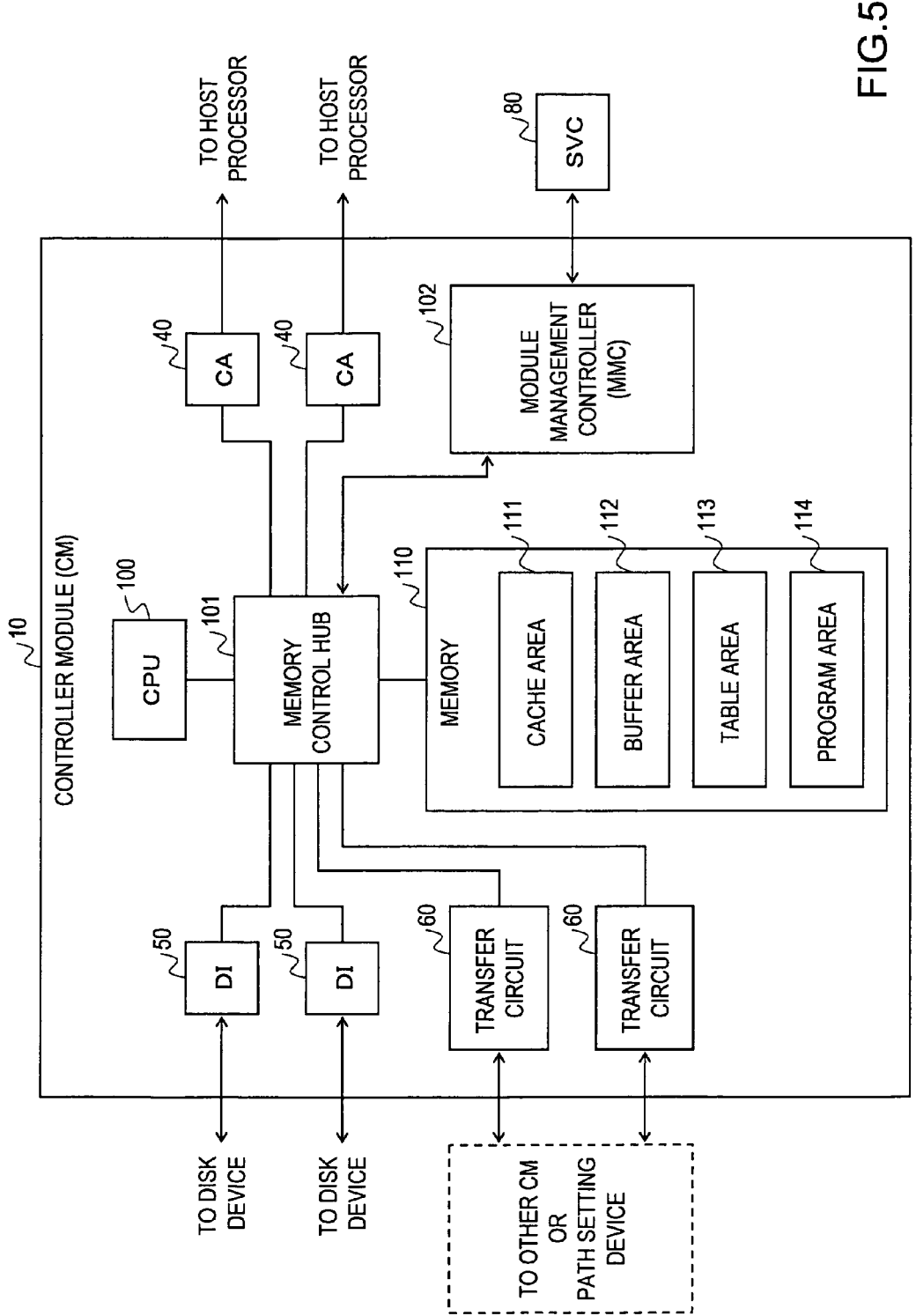
FIG. 5 is a block diagram of a CM.

FIG. 5 is a block diagram of the controller module. The CM 10 (as well as the CM 11) shown in the FIG. 1 includes one or more CPUs 100, a memory control hub 101, a memory 110, a plurality of channel adapters (CAs) 40 having an interface with a host processor, a plurality of device interface (DIs) 50 having an interface with a disk device, a plurality of transfer circuit 60 which performs data transfer by a DMA chips and the like, and a module management controller (MMC) 102.

The memory control hub 101 has capability to interconnect the CPU 100, the memory 110, the CA 40, the DI 50, the transfer circuit 60, and the module management controller 102. The memory 110 is provided with a cache area 111 used as a disk cache, a buffer area 112 for temporarily storing data to transfer, a table area 113 for storing table data for various types of controls, and a program area 114 for storing a control program which the CPU 100 executes.

The module management controller 102 is responsible for power monitoring, temperature monitoring, and so on, and implements various types of maintenance function of the disk controller 1 by communicating with a service controller (SVC) 80 having communication functions for maintenance and management.

When the disk controller 1 is composed of two CMs, a transfer circuit 60 is directly connected to a transfer circuit of its partner CM, and, when the disk controller 1 is composed of three or more CMs, transfer circuits 60 are connected to the path setting devices 70, 71.

The path obstruction determination unit 20 and the separation control unit 30 shown in FIG. 1 are realized by the CPU 110 and a program stored in the program area 114. Processes performed by the path obstruction determination unit 20 and the separation control unit 30 here will be described specifically.

[Process When A Path Obstruction is Occurred in Two CM Configuration]

In a case that the disk controller 1 is composed of two CMs, if a communication path is disappeared due to an anomaly, either one of the CMs is separated and then the operation is carried on. In this case, a CM to be separated is determined according to the following conditions (a) to (d). An order of priority of the conditions (a) to (d) is (a)>(b)>(c)>(d), and a condition having higher priority is looked for earlier.

(a) CM which has No Duplicated Data

In a case that both of communication paths are obstructed when data has not been duplicated due to install of a CM, an existence of CM which retains data that is not completed to be written back, or the like, since separating a CM whose data is not duplicated causes data loss, a CM whose data is duplicated is separated.

The CM whose data is not duplicated separates its partner CM if a path obstruction is detected. Although the CM whose data is duplicated basically expects to be separated from the CM whose data is not duplicated and wait for such separation from its partner CM, since there is possibility that a CM failure is appeared as a path obstruction though the CM failure actually occurs by a hang-up of the partner CM, the CM whose data is duplicated checks survival of the partner CM, and then, if survival of the partner CM is confirmed, performs self-Panic to avoid additional needles actions.

Panic means resetting on software basis and is performed regularly due to inability to continue processing such as when a conflict of software is detected. Self-Panic means that a CM resets itself on software basis and aborts a current process to avoid additional needles actions thereby preventing adverse effects on the system though expecting to be separated from its partner CM.

If survival of the partner CM cannot be confirmed, the self CM separates the partner CM since it cannot expect to be separated. By separating the CM whose data is not duplicated, it is machined down.

Figure 6:
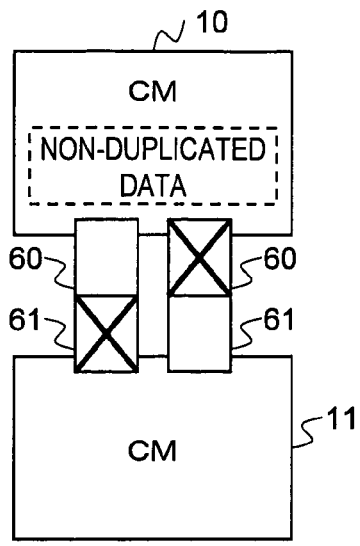
FIG. 6 is an example of separation of a CM which is not Dirty.
Figure 6:
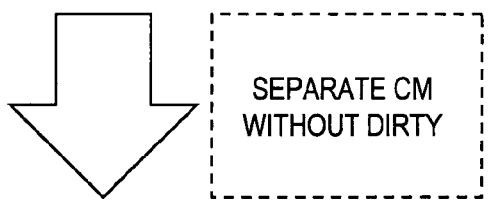
Figure 6:
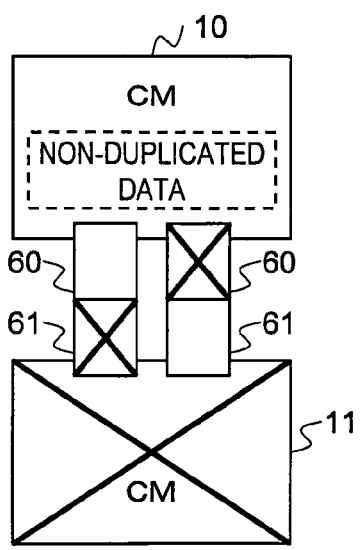

FIG. 6 illustrates an example of separation of a CM which is not Dirty. As used herein, a CM which is not Dirty means a CM which does not have data that has not been duplicated. In the example of the upper part of FIG. 6, as a CM 10 and a CM 11 cannot communicate with each other due to obstructions of both of paths, the CM 11 is separated, as illustrated in the lower part of FIG. 6, since the CM 10 has non-duplicated data so that the operation is continued by the CM 10.

(b) CM In which a North Port (NP) of a Transfer Circuit is Obstructed

A transfer circuit has an input port to inside of a self CM and an output port to a partner CM (or a path setting device), and the former is called a north port (NP) and the latter is called a south port (SP). An anomaly in an NP of a transfer circuit is an anomaly between the transfer circuit 60 and the memory hub 101 inside the CM 10 as shown in the FIG. 5, and cannot be eliminated without maintenance of the CM. Therefore, when a CM whose transfer circuit's NP is obstructed exists, it is separated.

However, when there are anomalies in NPs of transfer circuits on both of CMs, the following decision criteria are applied:

a CM without an anomaly of transfer circuit's NP separates
      a partner CM if it detects a path obstruction.
  a CM having an anomaly of transfer circuit's NP checks
      survival of a partner CM, and then, if survival of the partner CM is confirmed, performs self-Panic. If survival of the partner CM is not confirmed, it separates the partner CM.

Figure 7:
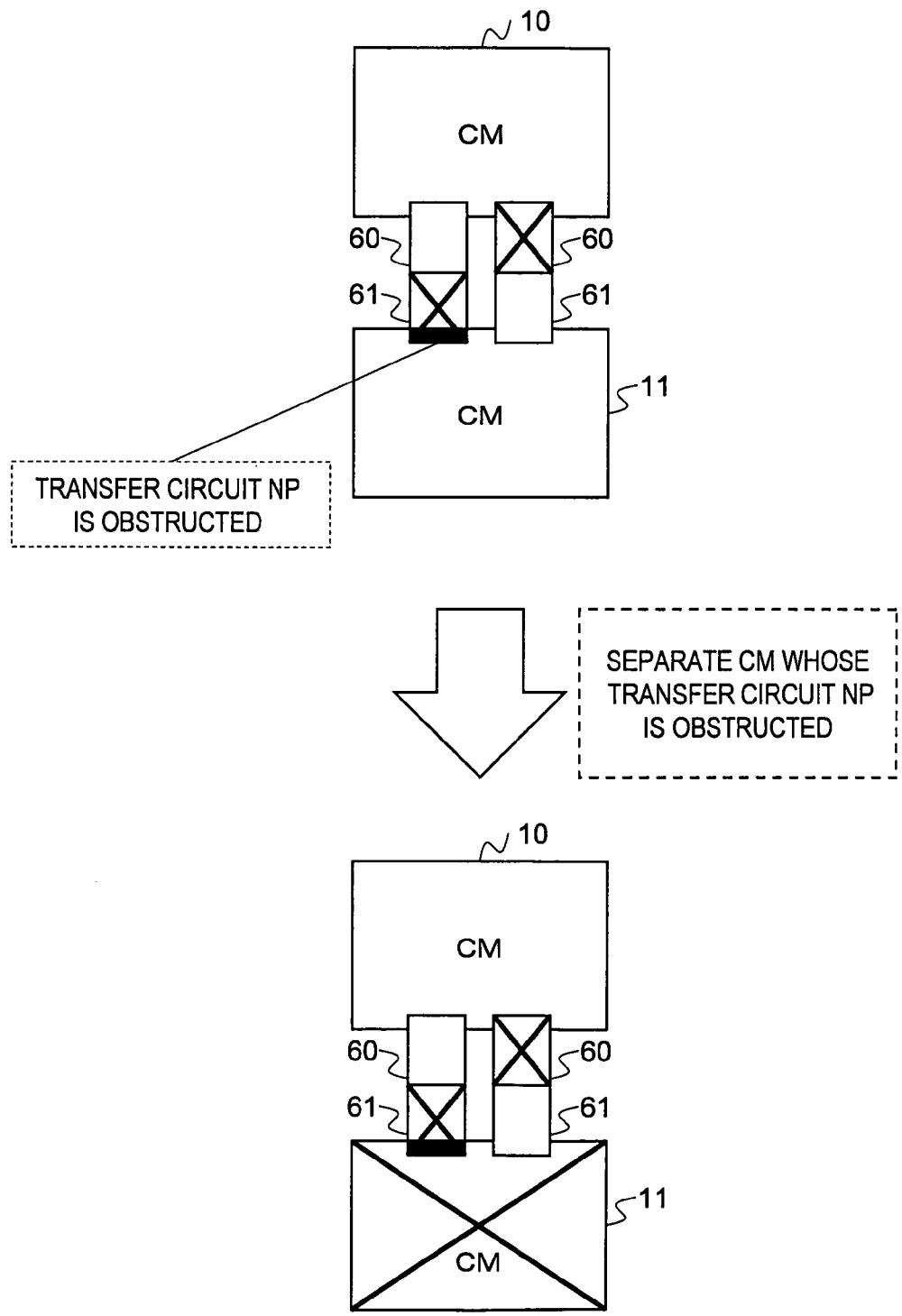
FIG. 7 is an example of separation of a CM when a transfer circuit NP is obstructed.

FIG. 7 illustrates an example of separation of CM in a case that a transfer circuit's NP is obstructed. In the example of the upper part of FIG. 7, a CM 10 and a CM 11 cannot communicate with each other due to obstruction of both of paths, and an anomaly of NP is occurred in a transfer circuit 61 of the CM 11. Therefore, as illustrated in the lower part of FIG. 7, the CM 11 is separated and the operation is continued by the CM 10.

(c) CM in which Other Parts are Obstructed

If there is no obstruction of transfer circuit's NP or if both CMs have same number of obstruction of transfer circuit's NP, a CM in which other parts are obstructed is separated. This is determined in the following order of precedence:

priority number 1: a CM in which both transfer circuits are obstructed priority number 2: a CM in which a CA that is online does not exist priority number 3: a CM in which the number of obstructed DI ports is greater A CM in which other parts are not obstructed separates its partner CM when it detects a path obstruction. A CM in which other parts are obstructed checks survival of its partner CM using a communication between SVCs, and then, if survival of the partner CM is confirmed, performs self-Panic. If survival of the partner CM is not confirmed, it separates the partner CM.

Figure 8A:
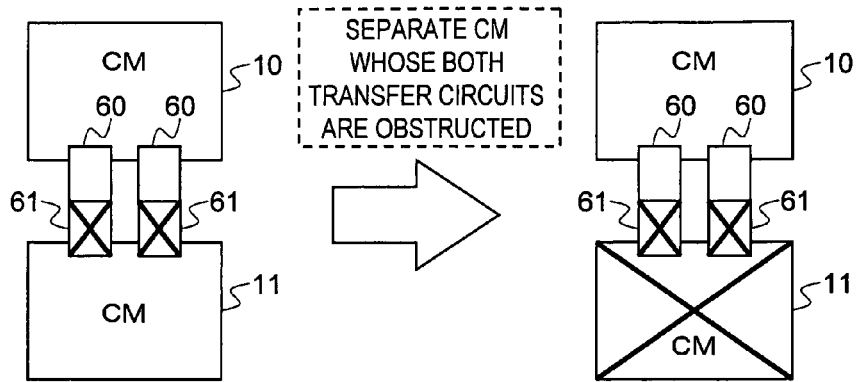
FIGS. 8A, 8B, and 8C are an example of separating a CM according to transfer circuit SP obstruction determination, CA obstruction determination, and DI port obstruction determination, respectively.

FIG. 8A illustrates an example of separation of a CM based on a transfer circuit's SP obstruction determination. In the example of FIG. 8A, two transfer circuits 61 of a CM 11 is SP(south port)-obstructed. Therefore, the CM 11 is separated according to the determination based on the priority number 1 described above.

Figure 8B:
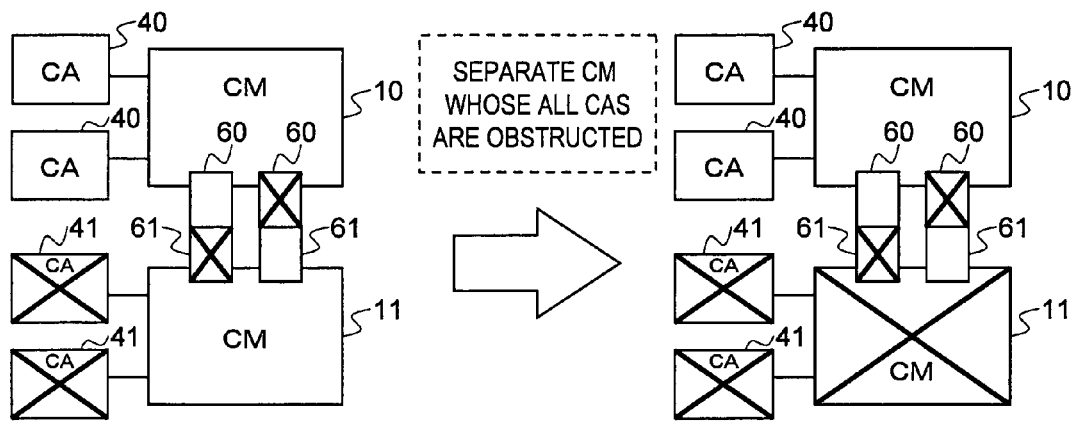

FIG. 8B illustrates an example of separation of a CM according to a CA obstruction determination. In the example of FIG. 8B, all CAs 41 of a CM 11 are obstructed. Therefore, the CM 11 is separated according to the determination based on the priority number 2 described above.

Figure 8C:
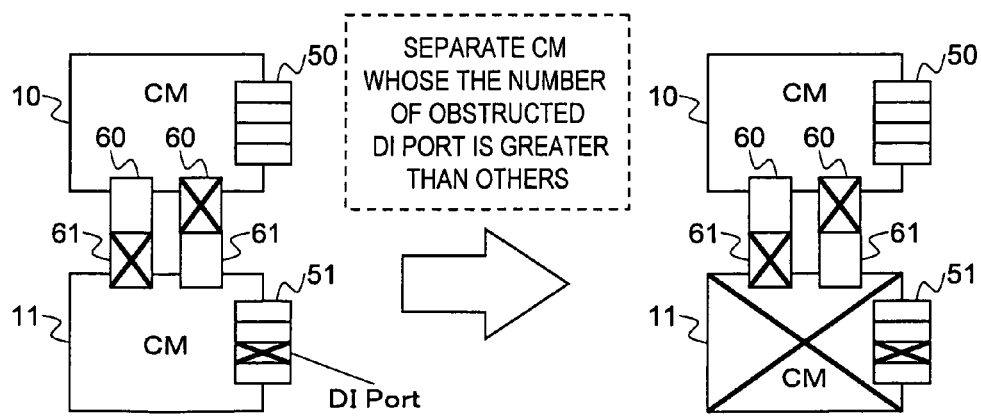

FIG. 8C illustrates an example of separation of a CM according to a DI port obstruction determination. In the example of FIG. 8C, the number of obstruction of a DI port (a connecting portion to a disk device) of a CM 11 is greater than that of a CM 10. Therefore, the CM 11 is separated according to the determination based on the priority number 3 described above.

(d) Slave CM

If the above conditions are not satisfied, a master CM is preferentially kept. The master CM is a CM which controls statuses of all CMs in the disk controller 1. CMs other than the master CM is referred to as a slave CM. If the master CM is separated due to a fault, one of slave CMs is selected as a new master CM.

If the maser CM detects a path obstruction, it separates a slave CM. Since there is possibility that the master CM is abnormal, the slave CM checks survival of the master CM using a communication between SVCs rather than performing self-Panic. If an anomaly is not detected in this check, the slave CM is separated and therefore performs self-Panic. If an anomaly is detected in this check, the master CM is separated because the master CM is abnormal.

Figure 9:
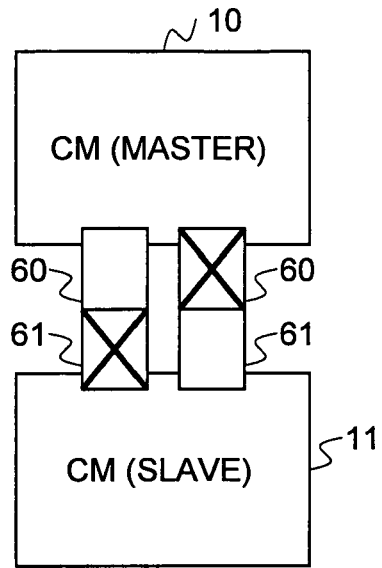
FIG. 9 is an example of separation of a slave CM.
Figure 9:
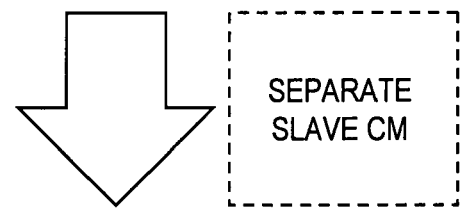
Figure 9:
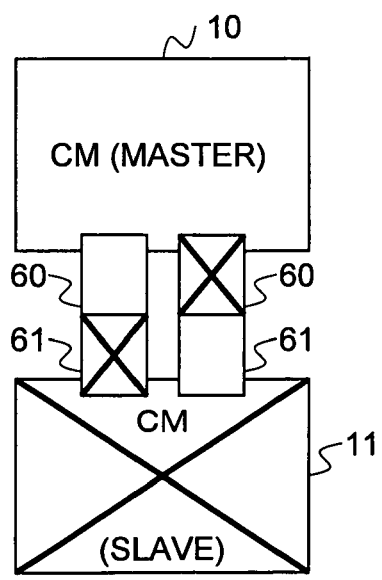

FIG. 9 illustrates an example of separation of a slave CM. In the example of the upper part of FIG. 9. Although both of paths of a CM 10 which is a master CM and a CM 11 which is a slave CM are obstructed, the CM 11 which is the slave CM is separated and the operation is continued by only the CM 10 so that the master CM is kept preferentially, as illustrated in the lower part of FIG. 9.

[Process in a Case that Path Obstructions Occur in a Configuration having Three or More CMs]

Unlike 2-CM configuration, there is a case that a CM can communicate with some CMs but cannot communicate with other CMs when transfer circuits are obstructed in a staggered pattern. If a CM which cannot communicate through a communication between CMs exists due to obstruction of a transfer circuit, a CM whose transfer circuit has already been obstructed is separated generally.

Figure 10:
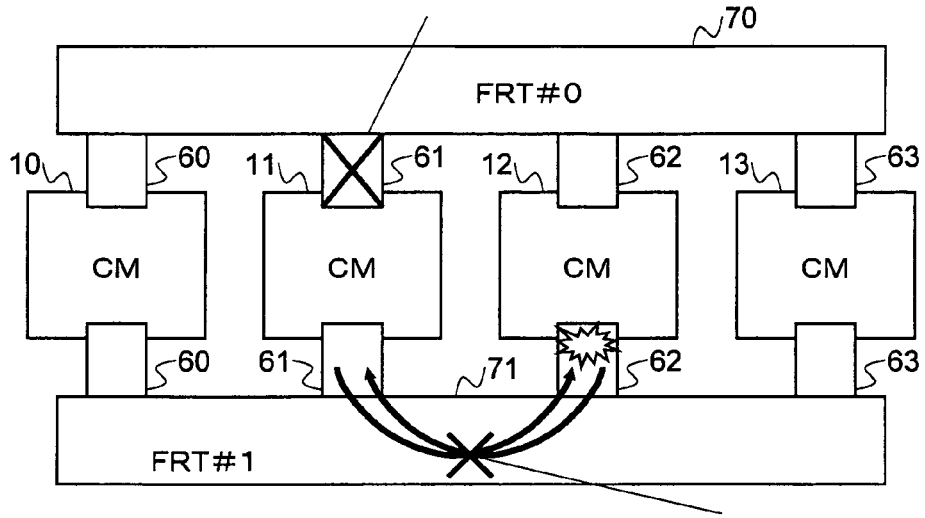
FIGS. 10 to 13 are an example of separation of CM(s) in a configuration having four CMs.
Figure 10:
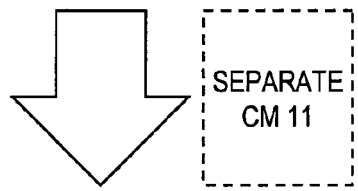
Figure 10:
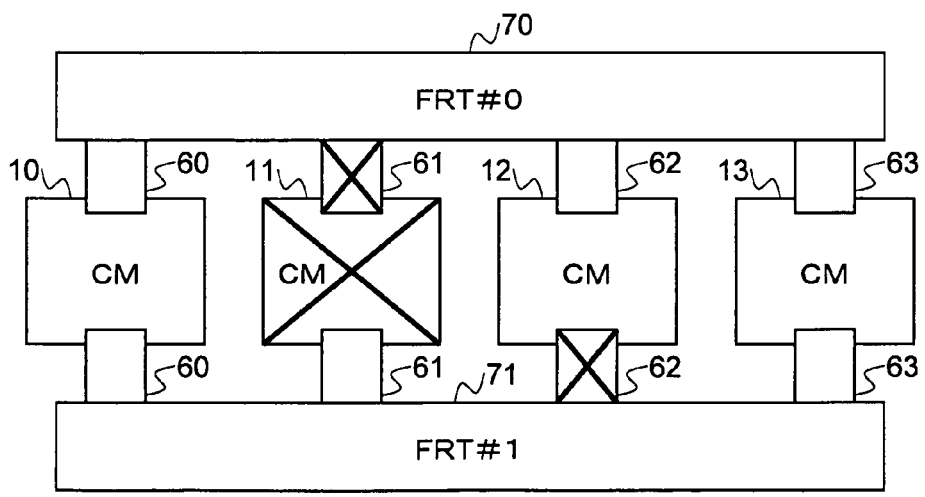

FIG. 10 illustrates an example of separation of a CM in 4-CM configuration. In the example of the upper part of FIG. 10A, a transfer circuit 61 to a path setting device 70 from a CM 11 (#0) is already separated. When an anomaly is occurred in a transfer circuit 62 to a path setting device 71 from a CM 12 (#1) in this situation, the communication path between the CM 11 and the CM 12 is lost and therefore the CM 11 and the CM 12 cannot communicate with each other. In this case, the CM 11 whose transfer circuit is already separated will be separated as shown in the lower part of FIG. 10.

Generally, a CM whose transfer circuit is already obstructed will be separated as described above, however, in a case that separation of such a CM causes data lost, a CM in which obstruction of a transfer circuit is detected later is separated. If non-operational status or data lost is caused even when the CM in which obstruction of a transfer circuit is detected later is separated, the entire system is stopped to be machine down.

Figure 11:
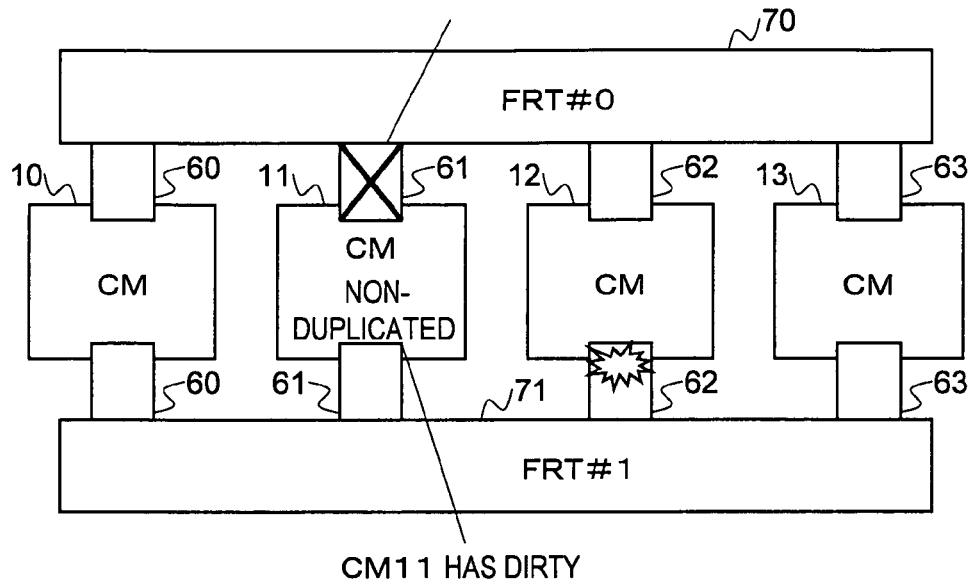
Figure 11:
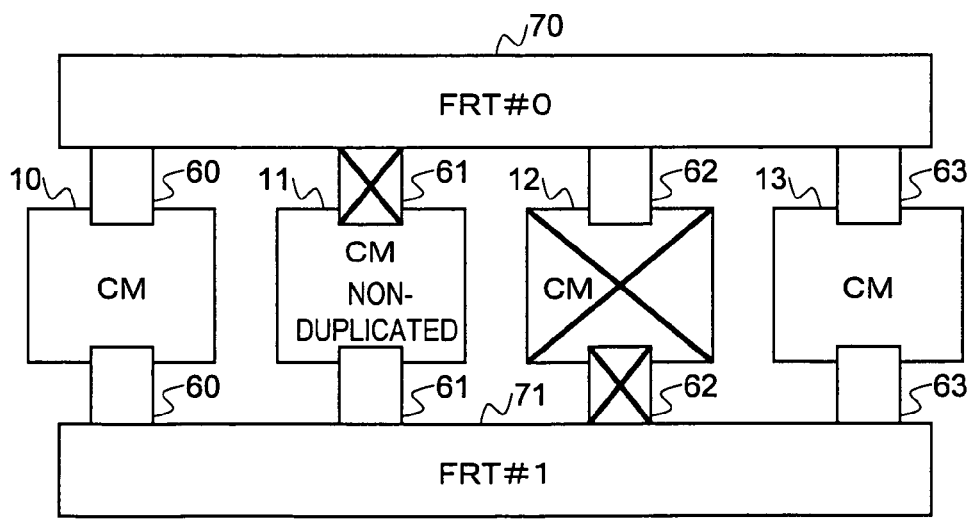

FIG. 11 illustrates an alternative example of separation of CM in the 4-CM configuration. In the example of the upper part of FIG. 11, the transfer circuit 61 to the path setting device 70 from the CM 11 (#0) is already separated, and in addition, the CM 11 is dirty, that is, its data has not been duplicated. When an anomaly is occurred in the transfer circuit 62 to the path setting device 71 from the CM 12 (#1) in this situation, the communication path between the CM 11 and the CM 12 is lost and therefore the CM 11 and the CM 12 cannot communicate with each other. In this case, instead of the CM 11 whose transfer circuit is already separated, the CM 12 will be separated as shown in the lower part of FIG. 11. As described above, since, when data of a CM whose transfer circuit is already obstructed is not duplicated, separation of the CM causes data lost, a CM in which anomaly of a transfer circuit is detected later is separated.

When there are a plurality of CM whose transfer circuits to the same path setting device (FRT) are obstructed, and a transfer circuit on path of their opposite side is obstructed, or when a CM whose transfer circuit is already obstructed is not mirrored, that is, when separation of the CM causes no data lost, the CM whose transfer circuit is already obstructed is separated. If separation of a CM whose transfer circuit is already obstructed causes data lost, a CM in which obstruction of a transfer circuit is detected later is separated.

Figure 12:
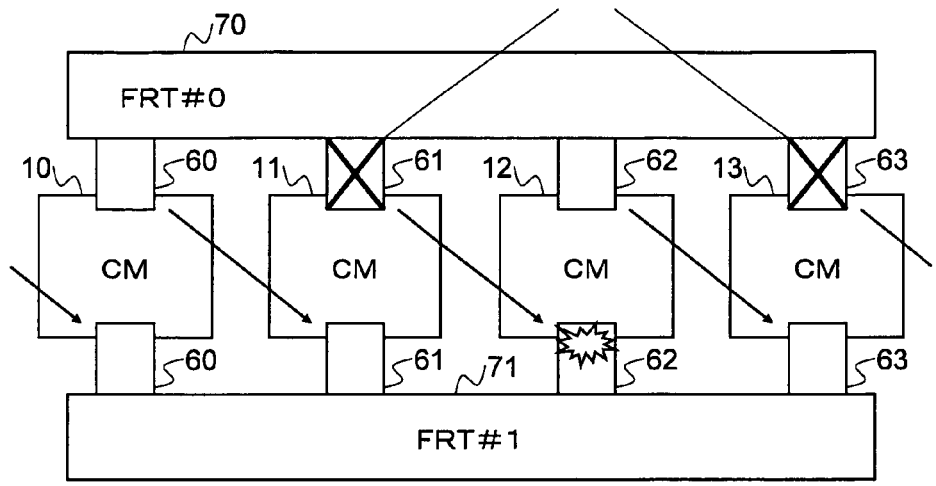
Figure 12:
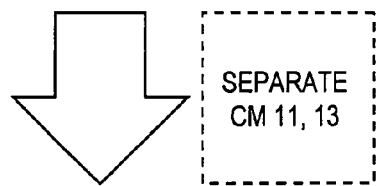
Figure 12:
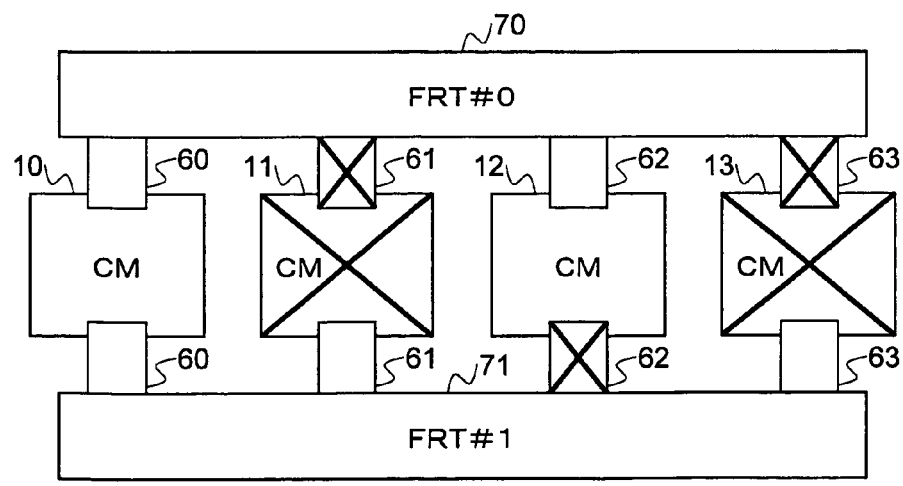

FIG. 12 illustrates an alternative example of separation of CMs in 4-CM configuration. In a situation shown in the upper part of FIG. 12, CM 10 and CM 11, CM 11 and CM 12, CM 12 and CM 13 and CM 13 and CM 10 are mirrored each other respectively. The "mirrored" means that the same data is retained in each CM and therefore the data has been duplicated. Additionally, it is assumed that transfer circuits 61 and 63 to the path setting device 70 of the CMs 11 and 13 are already separated respectively.

When an anomaly occurs in a transfer circuit 62 to the path setting device 71 from the CM 12 in this situation, the CM 11 and CM 12, and the CM 12 and CM 13 cannot communicate with each other. In this case, since the CM 11 and CM 13 are not mirrored, separation of them causes no data lost. Therefore, the CM 11 and the CM 13 separation of which cause no data lost are separated, as shown in the lower part of FIG. 12.

Figure 13:
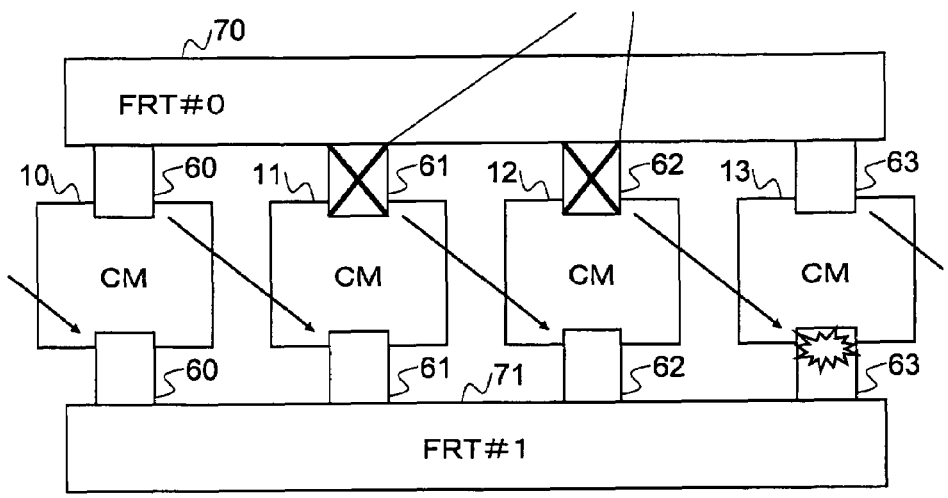
Figure 13:
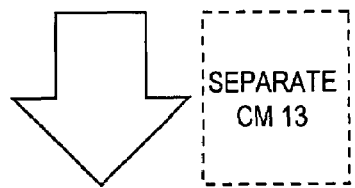
Figure 13:
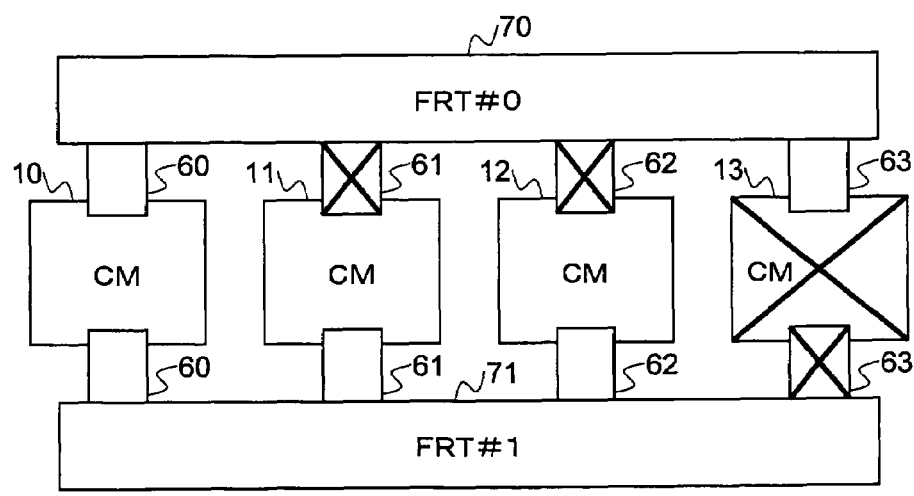

In the same way, CM 10 and CM 11, CM 11 and CM 12, CM 12 and CM 13 and CM 13 and CM 10 are mirrored each other respectively in a situation shown in the upper part of FIG. 13. Additionally, it is assumed that transfer circuits 61 and 62 to a path setting device 70 of the CMs 11 and 12 are already separated respectively. When an anomaly is occurred in a transfer circuit 63 to the path setting device 71 from the CM 13 in this situation, the CM 11 and CM 13, and the CM 12 and CM 13 cannot communicate with each other. In this case, since the CM 11 and CM 12 are mirrored, separation of these CMs causes data lost. Therefore, the CM 13 separation of which cause no data lost is separated as shown in the lower part of FIG. 13.

A processing flow of path obstruction determination according to an embodiment of the present invention will be described below with references to FIG. 14 to FIG. 16.

When an anomaly of a transfer circuit or a path setting device is detected and a separate event is detected (S10), a determination 1 which determines whether or not an obstruction determination is required is performed (S11). If there is no transfer circuit or the like already obstructed in the opposite side of a path which is an object to be separated this time, or if there is no transfer circuit or path setting device which is being separated, the process proceeds to step S13 and then ordinary separation is performed. In addition, if the disk controller 1 has 1-CM configuration (determination 2) (S12), the process also proceeds to step S13 and then ordinary separation is performed. As used herein, the ordinary separation means that only parts where anomalies have occurred are obstructed.

Otherwise, the process proceeds to step S14 and then a determination 3 which determines whether or not the disk controller 1 has 2-CM configuration is performed (S14). If the disk controller 1 is composed of three or more CMs, the process proceeds to step S30 of FIG. 16.

If the disk controller 1 has 2-CM configuration, a determination 4 which determines whether or not data of a partner CM has been duplicated is performed (S15). If the data of the partner CM has been duplicated, the process proceeds to step S20 of FIG. 15.

If the data of the partner CM has not been duplicated as a result of the determination 4, survival of the partner CM is checked through a communication between SVCs (S16). In other words, in 2-CM configuration, the CM cannot determine whether or not the partner CM actually operates normally even if the CM determines that the CM itself is an object to be separated. Since both of its communication paths are obstructed, survival of the partner CM is checked using a communication through a service controller (SVC) 80. Basically, such a communication though the SVC 80 is not used during operation.

Based on a result of this SVC communication, a determination 5 which determines whether or not there is a response from the partner CM is performed (S17). If there is a response form the partner CM, it is determined that the partner CM survives, and then the process proceeds to step S18. On the other hand, if there is no response from the partner CM, it is determined that the partner CM does not survive, and then the process proceeds to step S19.

When there is a response form the partner CM, the self CM will be separated from the partner CM, and further performs self-Panic to avoid to do additional unnecessary actions (S18). As described above, the self-Panic means that a CM resets itself on software basis to avoid to do additional unnecessary actions thereby preventing adverse effects on the system though expecting to be separated from its partner CM.

When there is no response from the partner CM, since there is no CM other than the self CM, the partner CM is separated (S19) though the self CM should be separated primarily.

Figure 15:
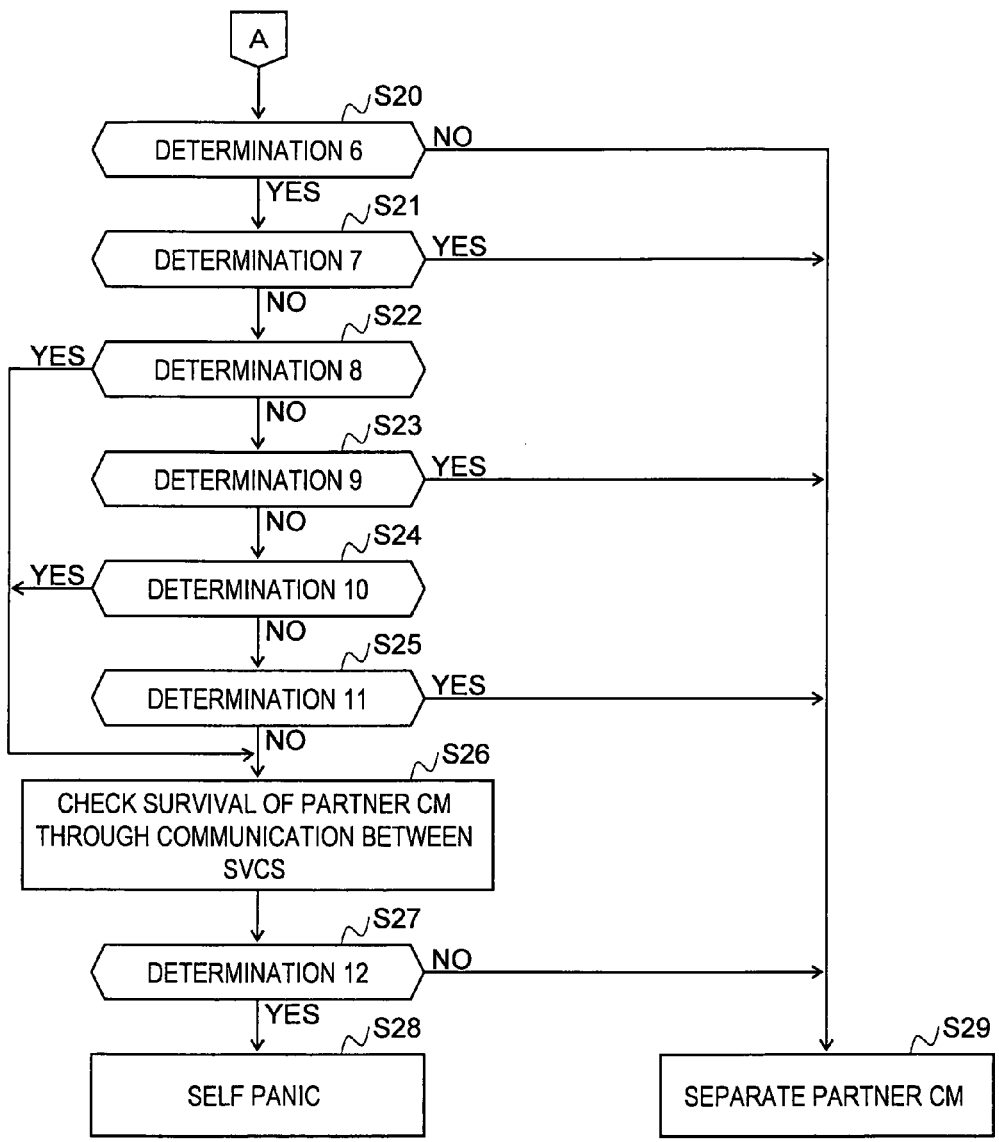

If it is found that data of the partner CM has been duplicated in the determination 4, the process proceeds to step S20 of FIG. 15, and then a determination 6 which determines whether or not data of the self CM has been duplicated is also performed. If the data of the self CM has not been duplicated, the process proceeds to step S29, and then the partner CM is separated.

If the data of the self CM has also been duplicated, a determination 7 and a determination 8 which compare the number of NP obstruction of transfer circuits of the partner CM and that of the self CM are performed (S21, S22). If the number of NP obstruction of transfer circuits of the partner CM is more than that of the self CM, the process proceeds to step S29, and then the partner CM is separated. If the number of NP obstruction of transfer circuits of the self CM is more that that of the partner CM, the process proceeds to step S26.

If both of the partner CM and the self CM are not obstructed, or if the number of NP obstruction of transfer circuits of the partner CM and the self CM is the same, the process proceeds to step S23, and then a determination 9 and a determination 10 which compares the number of obstructed parts of the partner CM and the self CM are performed (S23, S24). If the partner CM has more obstructed parts than the self CM has, the process proceeds to step S29, and then the partner CM is separated. If the self CM has more obstructed parts than the partner CM has, the process proceeds to step S26.

If both of the partner CM and the self CM has no obstructed parts, or if the number of obstructed parts of them is the same, the process proceeds to step S25, and then a determination 11 which determines whether or not the self CM is a master CM is performed. If the self CM is a master CM, the process proceeds to step S29 and then the partner CM is separated. If the self CM is a slave CM, the process proceeds to step S26.

At step S26, survival of the partner CM is checked using a communication through the SVC 80. Based on the result of this SVC communication, a determination 12 which determines whether or not there is a response from the partner CM is performed (S27). If there is a response form the partner CM, it is determined that the partner CM survives, and the self CM performs self-Panic (S28). If there is no response from the partner CM, it is determined that the partner CM does not survive, and the process proceeds to S29, and then the partner CM is separated.

Figure 14:
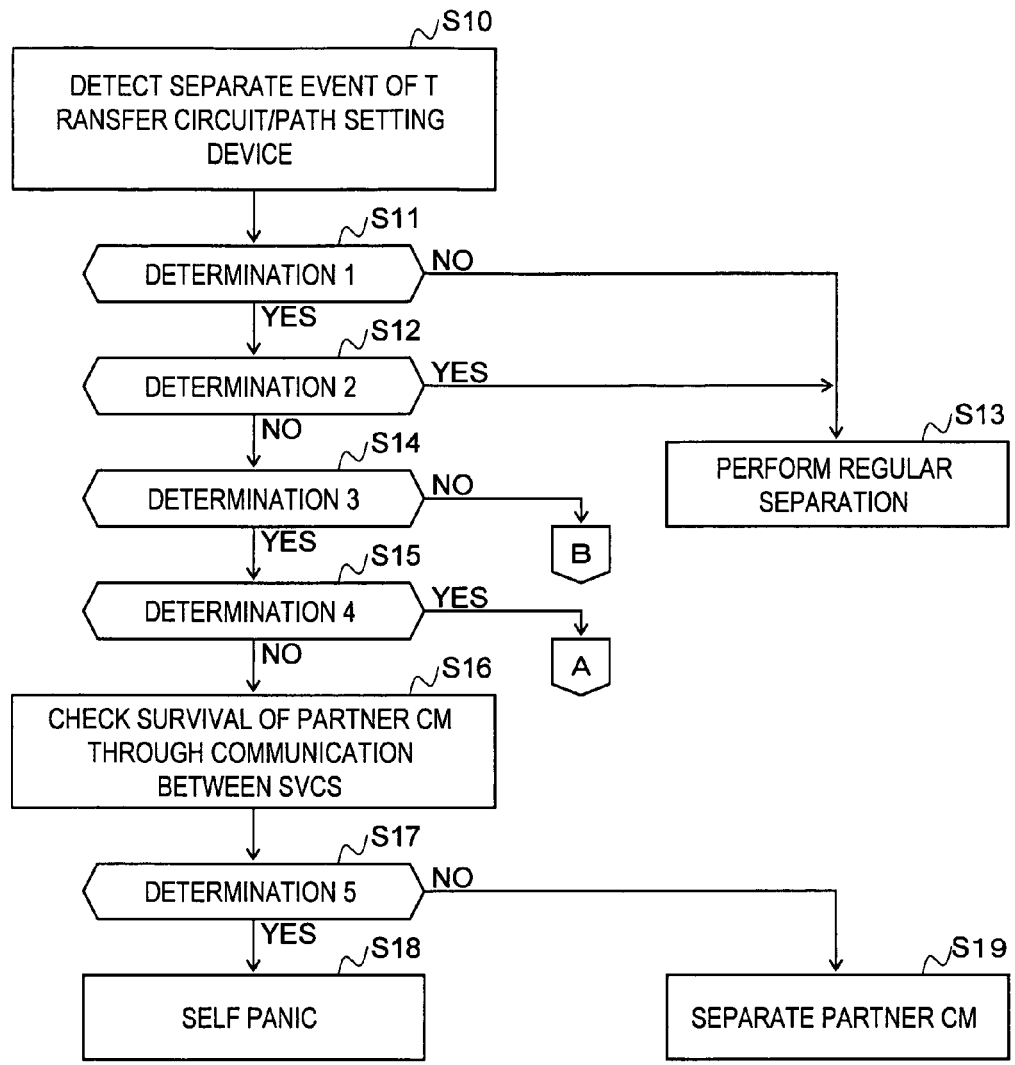
FIGS. 14, 15, and 16 are a flowchart of a process of path obstruction determination according to an embodiment of the present invention.
Figure 16:
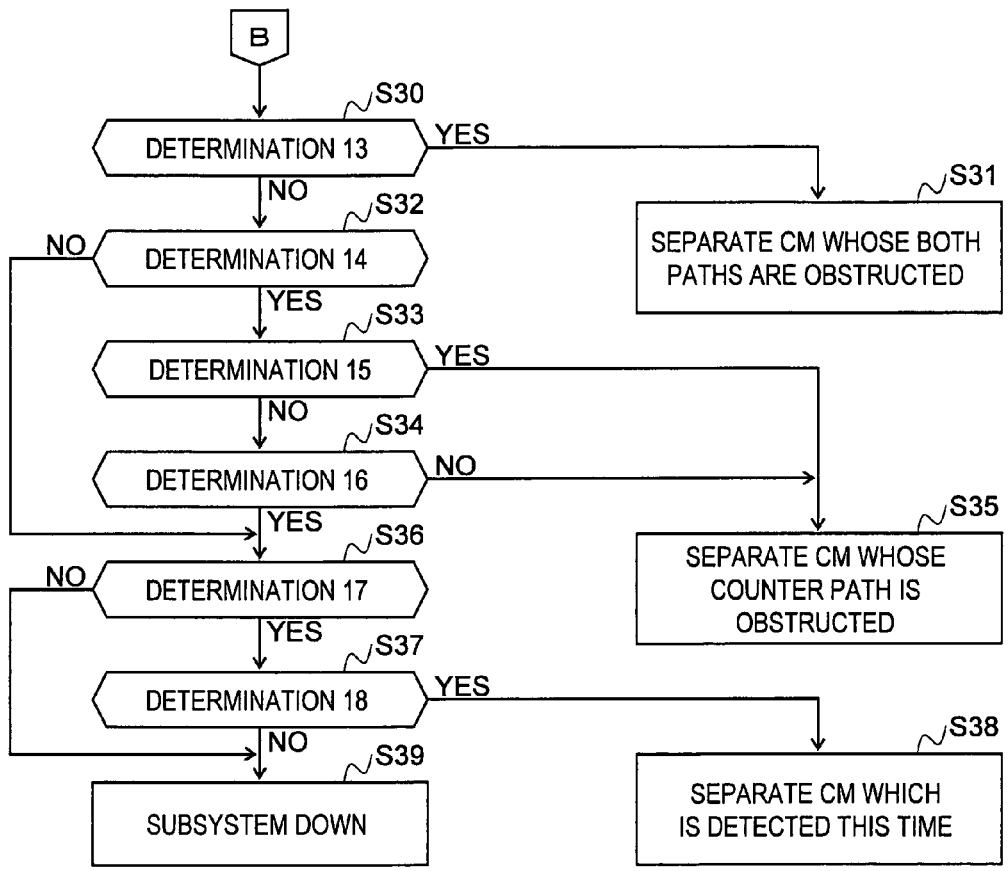

In the determination 3 of FIG. 14, if it is found that the disk controller 1 is composed of three or more CMs, the process proceeds to step S30 of FIG. 16, and then a determination 13 which determines whether or not both paths are obstructed by obstruction of this time is performed. When separation of a transfer circuit which is in a communication path of the opposite side of a transfer circuit or a path setting device that is an object to be obstructed this time (hereinafter called opposite path) is detected, the process proceeds to step S31, and then a CM whose both paths are obstructed is separated.

If both paths are not obstructed, a determination 14 which determines whether or not data of a CM whose opposite path is obstructed has been duplicated is performed (S32). If the data of the CM whose opposite path is obstructed has not been duplicated, the process proceeds to step S36.

If the data of the CM whose opposite path is obstructed has been duplicated, a determination 15 which determines whether or not the number of CMs whose opposite paths are obstructed is one is performed (S33). If the number of CMs whose opposite paths are obstructed is one, the process proceeds to step S35, and then a CM whose opposite path is obstructed is separated. If the number of those CMs is two or more, a determination 16 which determines whether or not the CMs whose opposite paths are obstructed are mirrored is performed (S34). If they are not mirrored, that is, separation of them cause no data lost, the process proceeds to step S35, and then the CM whose opposite path is obstructed is separated. If they are mirrored and separation of them cause data lost, the process proceeds to step S36.

At step S36, a determination 17 which determines whether or not detection at this time is separation of a transfer circuit is performed. If an object to be separated this time is not a transfer circuit but a path setting device, since separation of any transfer circuit causes data lost and makes it impossible to continue a further operation, the process proceeds to step S39 and then subsystem down is configured. As used herein, the subsystem down means that, if continuation of an operation as a system is impossible such as when separation of CM whose data has not been duplicated is detected, a host interface of the disk controller 1 is closed and the operation is stopped to minimize such an effect on the system.

If separation of a transfer circuit is detected at this detection, a determination 18 which determines whether or not data of a CM whose transfer circuit is separated this time has been duplicated is performed (S37). If the data has been duplicated, the CM detected this time is separated (S38). If the data has not been duplicated, the process proceeds to step S39, and then subsystem down is configured.

Additionally, in the disk controller 1 in 2-CM configuration, there is also a case that data of CM which is an object to be separated has not been duplicated when the CM is separated, and, if such separation of CM is detected, subsystem down is configured. At step S31, S35, and S38, when an object to be separated by a CM which detects a separation is the CM itself, the CM notifies a master CM of such detection of separation though whether or not it can be actually communicated is unknown (when the master CM detects separation, the master CM notifies a CM which becomes a master CM next). Regardless of the result of the communication of such notification, the CM does not perform any subsequent process and waits for being separated from the master CM.

Figure 17:
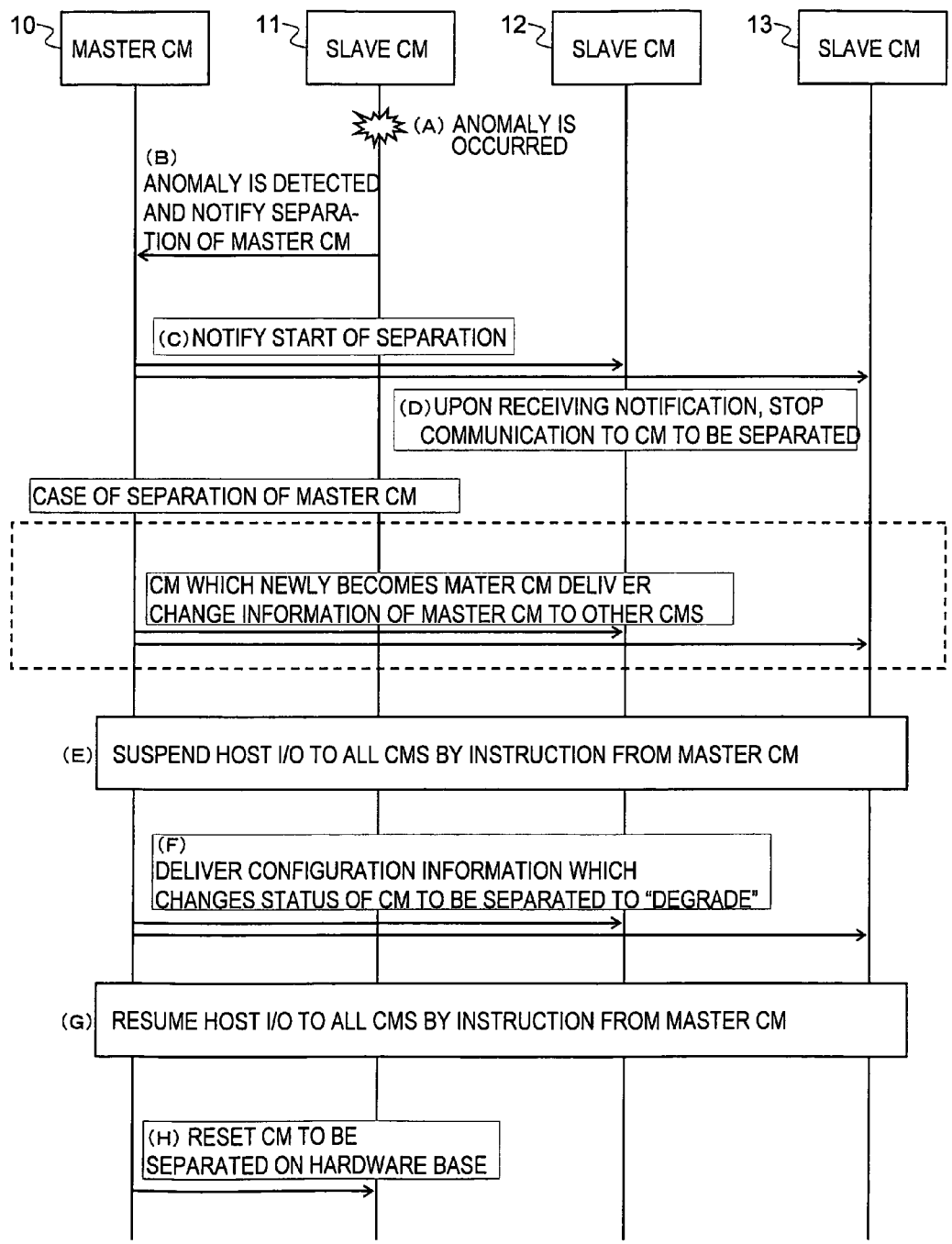
FIG. 17 is a flowchart of a process of separation of a CM according to an embodiment of the present invention.
Figure 19:
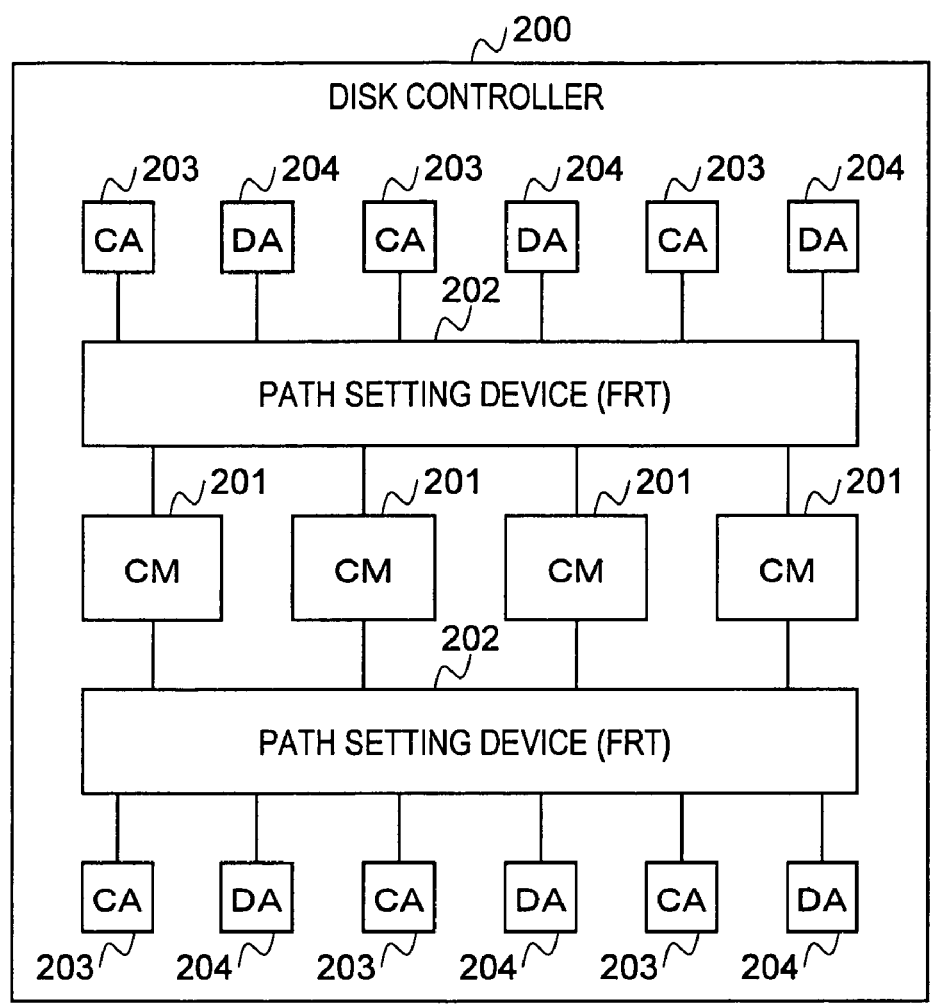
FIG. 19 is an example of a conventional disk controller.
Figure 20:
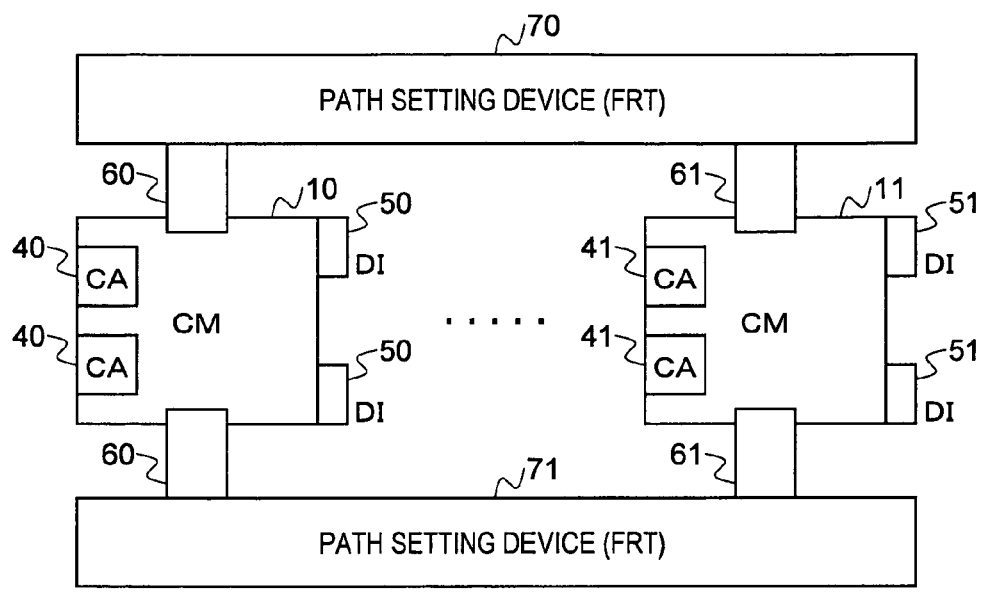
FIG. 20 is a diagram for describing problems to be solved by the present invention.

FIG. 17 shows a processing flow of separation of a CM according to an embodiment of the present invention. Separation of CM by the separation control unit 30 shown in FIG. 1 is performed as described below. Hereinafter, the processing flow is described with references to (A) to (H) of FIG. 17. In this example, a CM 10 is a master CM, and other CMs 11 to 13 is a slave CM.

(A) An anomaly occurs in the CM 11 which is a slave CM.

(B) When the CM 11 detects the anomaly, the CM 11 notifies the CM 10 which is a master CM of separation. In addition, when a CM other than the self CM detects the anomaly, the master CM is notified of it. In these cases, when a CM other than the master CM detects an anomaly of the master CM, a CM which becomes a master CM next is notified of the anomaly. When the master CM detects an anomaly of itself, it starts a separation process as it is.

(C) The CM 10 which is the master CM notifies CMs 12, 13 which are other slave CMs of a start of the separation.

(D) When the CMs 12, 13 are notified of the start of the separation from the CM 10, they abort a further communication to the CM 11 which is an object to be separated. In a case of separation of the master CM, a CM which becomes a new master CM delivers change information of the mater CM to other CMs.

(E) Host I/Os to all CMs is suspended according to an instruction from the master CM. In other words, I/Os of a host processor is stopped temporarily.

(F) The CM 10 which is the master CM delivers configuration information in which a status of the CM 11 to be separated is changed to "degrade", to other CMs 12, 13.

(G) The host I/Os to all CMs are resumed according to an instruction from the master CM. In other words, the I/Os of the host processor that has been stopped temporarily are resumed.

(H) Finally, the CM 10 which is the master CM resets the CM 11 which is an object to be separated on hardware basis. Thus, the process of separation of the CM 11 is completed.

FIG. 18A to FIG. 18D illustrate configuration examples of tables in which control data used by the path obstruction determination unit 20 and the separation control unit 30 in the CM 10 are stored. These tables are stored in the table area 113 in the memory 110. Each CM has these tables, synchronization of these table is lead by a master CM. In other words, when a content of a table is changed, such changed information is delivered form the master CM to other CMs so that the same content is maintained in these tables.

A table illustrated in FIG. 18A is a table which retains CM's CPU information. In this table, module ID is identification information for identifying a module of CPU. Role is information which indicates a role of a relevant CM, that is, indicates whether the CM is a master CM or a slave CM.

Dirty Flag is a flag for indicating a state of dirty recovery, and is set from when data of a CM which is separated, installed, or the like is non-duplicated until when the non-duplicated data is duplicated. When a CM whose value is set as Dirty Flag is separated, data lost is caused. DI port status is information which indicates whether or not a port is obstructed for each port of device interfaces (DIs) to disk devices.

Although the CM's CPU information table has many other types of information such as a variety of status information or types of defined parts, detailed descriptions of such information which does not relate to the present invention is omitted.

A table illustrated in FIG. 18B is a CM information table which stores information required for each CM. In this table, module ID of master CPU is a module ID which indicates a CPU that becomes a master CPU when a CM includes a plurality of CPUs.

Path status is status information used for separating a route between a CM and a path setting device (FRT) for each path. Transfer circuit NP status is status information indicates whether or not a transfer circuit is being NP obstructed for each transfer circuit, and transfer circuit SP status is status information indicates whether or not a transfer circuit is being SP obstructed for each transfer circuit. Other than those above, there are various kinds of status information such as status information of module management controller 102.

A table illustrated in FIG. 18C is a CA information table which stores necessary information for each channel adapter (CA). The CA information table has information as a status which indicates whether or not the CA is normal or abnormal.

A table illustrated in FIG. 18D is an FRT information table which stores necessary information for each path setting device. The FRT information table has information as a status which indicates whether or not a path setting device is normal or abnormal.

The path status in the CM information table of FIG. 18B and the status in the FRT information table of FIG. 18D are used for determination of a state of path obstruction by the path obstruction determination unit 20. There is some amount of time lag between a detection of separation and a change of these statuses. Therefore, the master CM locally memorizes information of whether or not a transfer circuit or a path setting device is being separated other than these information tables so that the master CM can determines whether or not a status will be changed in future even before the status is changed.

The transfer circuit NP status in the CM information table of FIG. 18B is used for determination of transfer circuit NP obstruction by the path obstruction determination unit 20. Additionally, this status, the transfer circuit SP status, the DI port status in the CM's CPU information table of FIG. 18A, and the status in the CA information table of FIG 18C are used for determination of the number of obstructed parts by the path obstruction determination unit 20.

What is claimed is:

1. A disk controller comprising a plurality of controller modules for controlling data transfer between a host processor and a disk device, each controller module having one or more channel adapters having an interface with the host processor, one or more device interfaces having an interface with the disk device, and one or more transfer circuits for communication, said plurality of controller modules having a function to communicate with each other through a communication path using said one or more transfer circuits;
at least one of said controller modules comprising:
a path obstruction determination unit for obstructing a part in which an anomaly occurs when the anomaly occurs on said communication path, and, when said plurality of controller modules cannot communicate between them due to the obstruction of the part, for determining an object to be separated in a way that prioritizes a controller module which retains data that has not been duplicated over a controller module which retains data that has been duplicated among the controller modules which cannot communicate; and
a separation control unit for disabling a control module that is determined to be an object to be separated by said path obstruction determination unit.

2. The disk controller according to claim 1 wherein,
when said path obstruction determination unit cannot determine a controller module which is an object to be separated based on whether or not duplicated data is retained, said path obstruction determination unit determines a controller module which is an object to be separated based on a position of the obstructed part and a number thereof on said communication path.

3. The disk controller according to claim 2 wherein,
when said path obstruction determination unit cannot determine a controller module which is an object to be separated based on the position of the obstructed part and the number thereof on said communication path, said path obstruction determination unit further determines a controller module which is an object to be separated in a way that prioritizes a controller module other than one controller module that is a predetermined master.

4. The disk controller according to claim 1, wherein
said path obstruction determination unit checks survival of another controller module which is a candidate for an object to be separated, when the at least one of the controller modules is a candidate for an object to be separated, by a communication means which is different from the communication using said communication path, and then, if survival of the checked candidate cannot be confirmed, said path obstruction determination unit determines an object to be separated to be the controller module whose survival cannot be confirmed.

5. A disk controller comprising a plurality of controller modules for controlling data transfer between a host processor and a disk device, each controller module having one or more channel adapters having an interface with the host processor, one or more device interfaces having an interface with the disk device, and a plurality of transfer circuits for communication, said plurality of controller module having a function to communicate with each other through a plurality of communication path using a paths setting device which has a switching function to interconnect said transfer circuits, said disk controller comprising:
a path obstruction determination unit for obstructing a part in which an anomaly occurs when the anomaly occurs on said communication paths, and, when said plurality of controller modules cannot communicate between them due to the obstruction of the part, for determining an object to be separated to be a controller module whose all communication paths are obstructed due to the obstruction of the part, and, when an object to be separated cannot be determined by this way, for determining an object to be separated in a way that prioritizes a controller module which retains data that has not been duplicated over a controller module which retains data that has been duplicated among the controller modules which cannot communicate; and
a separation control unit for disabling a control module that is determined to be an object to be separated by said path obstruction determination unit.

* * * * *